United States Patent
Zhang et al.

(10) Patent No.: US 10,713,318 B2
(45) Date of Patent: Jul. 14, 2020

(54) OPTIMIZING LISTING EFFICIENCY AND EFFICACY FOR A DELIVERY COORDINATION SYSTEM

(71) Applicant: Uber Technologies, Inc., San Francisco, CA (US)

(72) Inventors: Xian Xing Zhang, Mountain View, CA (US); Sidney Zhang, San Francisco, CA (US); Yuyan Wang, Millbrae, CA (US); Mihir Gogate, San Francisco, CA (US); Yuanchi Ning, San Francisco, CA (US); Chen Peng, Sunnyvale, CA (US); Isaac Liu, Fremont, CA (US); Calvin Lee, San Francisco, CA (US)

(73) Assignee: Uber Technologies, Inc., San Francisco, CA (US)

(*) Notice: Subject to any disclaimer, the term of this patent is extended or adjusted under 35 U.S.C. 154(b) by 476 days.

(21) Appl. No.: 15/586,190

(22) Filed: May 3, 2017

(65) Prior Publication Data
US 2018/0322203 A1 Nov. 8, 2018

(51) Int. Cl.
| | |
|---|---|
| *G06F 16/9535* | (2019.01) |
| *G06Q 50/12* | (2012.01) |
| *G06Q 30/02* | (2012.01) |
| *G06F 16/248* | (2019.01) |
| *G06F 16/2457* | (2019.01) |
| *G06F 16/2453* | (2019.01) |

(52) U.S. Cl.
CPC ........ *G06F 16/9535* (2019.01); *G06F 16/248* (2019.01); *G06F 16/24534* (2019.01); *G06F 16/24578* (2019.01); *G06Q 30/0282* (2013.01); *G06Q 50/12* (2013.01)

(58) Field of Classification Search
None
See application file for complete search history.

(56) References Cited

U.S. PATENT DOCUMENTS

| | | | |
|---|---|---|---|
| 8,935,245 B1* | 1/2015 | Cionca .................. | G06F 16/951 707/732 |
| 2004/0030776 A1* | 2/2004 | Cantrell .................. | H04L 29/06 709/224 |

(Continued)

*Primary Examiner* — James Trujillo
*Assistant Examiner* — Cheryl M Shechtman
(74) *Attorney, Agent, or Firm* — Fenwick & West LLP

(57) ABSTRACT

A delivery coordination system selects restaurant listings for presentation to a user by filtering out restaurants that are unlikely to be of interest to the user, while ensuring that restaurant listings are selected to encourage the success of all restaurants using the delivery coordination system. In response to receiving the listings request from a client device, the delivery coordination system selects a filtered set of restaurant listings from the plurality of restaurant listings stored by the delivery coordination system by applying filtering criteria to the plurality of stored restaurant listings. The delivery coordination system generates conversion scores for the restaurant in the filtered set of restaurant listings and selects restaurant listings to present to the user from the filtered set of restaurant listings based on selection factors, which can include the generated conversion scores. The delivery coordination system transmits the selected restaurant listings to the client device.

18 Claims, 4 Drawing Sheets

(56) References Cited

U.S. PATENT DOCUMENTS

| | | | | |
|---|---|---|---|---|
| 2006/0143080 A1* | 6/2006 | Garg | ................ | G06Q 30/02 |
| | | | | 705/14.24 |
| 2011/0208617 A1* | 8/2011 | Weiland | ................ | G06Q 30/00 |
| | | | | 705/27.1 |
| 2013/0066821 A1* | 3/2013 | Moore | ................ | G06Q 30/0259 |
| | | | | 706/46 |
| 2013/0166348 A1* | 6/2013 | Scotto | ................ | G06Q 30/0205 |
| | | | | 705/7.29 |
| 2014/0101135 A1* | 4/2014 | Yousaf | ................ | G06F 16/24534 |
| | | | | 707/722 |
| 2015/0324936 A1* | 11/2015 | Wilson | ................ | G06Q 50/12 |
| | | | | 705/15 |
| 2016/0180476 A1* | 6/2016 | Talwar | ................ | G06Q 50/12 |
| | | | | 705/5 |
| 2016/0321712 A1* | 11/2016 | Schipper | ................ | G06Q 30/0282 |

* cited by examiner

OPTIMIZING LISTING EFFICIENCY AND EFFICACY FOR A DELIVERY COORDINATION SYSTEM

BACKGROUND

A delivery coordination system enables a user to place orders with restaurants via the Internet. Delivery coordination systems present restaurant listings for restaurants using the delivery coordination system to a user via a user interface, and the user can use the user interface to place an order through the delivery coordination system. However, conventional delivery coordination systems tend to be inefficient, because restaurants that are not likely to be picked by the user are still fully evaluated by the delivery coordination system. Furthermore, conventional delivery coordination systems select restaurant listings for presentation based on which restaurants are historically selected by users of the delivery coordination system. However, this methodology disadvantages newer restaurants with fewer total order requests from being presented to users of the delivery coordination system, and thus may cause the restaurants to no longer use the delivery coordination system.

SUMMARY

A delivery coordination system selects restaurant listings for presentation to a user by filtering out restaurants that are not likely to be of interest to the user, while ensuring that restaurant listings are selected to encourage the success of all restaurants using the delivery coordination system.

The delivery coordination system receives a request for listings from a client device. The request may be sent to the delivery coordination system in response to the user selecting an option to transmit the listings request, or in response to the user opening an application associated with the delivery coordination system. In response to receiving the listings request, the delivery coordination system selects a filtered set of restaurant listings from the plurality of restaurant listings stored by the delivery coordination system. The filtered set of restaurant listings may be generated upon receiving the listings request, or may be pre-generated before the listings request is received. The delivery coordination system can select the filtered set of restaurant listings by applying filtering criteria to the plurality of stored restaurant listings. The filtering criteria can include popularity criteria that require that restaurant meet a threshold popularity to be included in the filtered set. The filtering criteria may be adjusted based on the computational resources used by the delivery coordination system. For example, if the delivery coordination system is using an increasing amount of computational resources, the delivery coordination system may raise thresholds within the filtering criteria, thereby reducing the number of restaurants selected for the filtered set. Additionally, the filtering criteria may be adjusted to allow a new restaurant for which the delivery coordination system has insufficient data to be included in the filtered set, even if the restaurant may be associated with a low popularity score.

The delivery coordination system generates conversion scores for the restaurant in the filtered set of restaurant listings. The conversion scores represent the likelihood that the user who submitted the listings request will place an order with the restaurant, and may be generated based on a restaurant popularity model, a user preference model, and an affinity model. The delivery coordination system selects restaurant listings to present to the user from the filtered set of restaurant listings based on selection factors, which can include the generated conversion scores. The selection factors may also include whether the restaurants can be included in a customized group for the user, the time since a restaurant's last order request, whether the restaurant is a new restaurant, the number of order requests the restaurant has, and the amount of the fees the restaurant pays to use the delivery coordination system. The delivery coordination system can apply weightings to the selection factors, and the weightings may be selected based on models that optimize for the success of all restaurants using the delivery coordination system. For example, the delivery coordination system may apply weights to the selection factors to optimize the total number of order requests received by the delivery coordination system, the total amount of money received by all restaurants using the delivery coordination system, the retention rate of restaurants using the delivery coordination system, the total amount of fees paid by restaurants using the delivery coordination system, or the total number of restaurants using the delivery coordination system.

The delivery coordination system transmits the selected restaurant listings to the client device. The client device can display the restaurant listings to the user with options to place orders with the restaurant. If the user selects an option to place an order with a restaurant, the client device transmits an order request to the delivery coordination system, and the delivery coordination system transmits an order notification to the restaurant. The delivery coordination system then assigns a driver to pick up the order and deliver it to the user.

By applying the filtering criteria to the restaurant listings, the delivery coordination system reduces the number of restaurants for which the delivery coordination system evaluates for possible presentation to the user. Thus, the delivery coordination system can use the filtering criteria to eliminate restaurants that are unlikely to be of interest to the user, and thus reduce the computational resources used by the delivery coordination system. Additionally, by adjusting the filtering criteria to include restaurants for which the delivery coordination system does not contain enough data and by weighting the selection factors to optimize the success of all restaurants using the delivery coordination system, the delivery coordination system can ensure that new restaurants are being presented to users, and thereby remain interested in using the delivery coordination system.

DETAILED DESCRIPTION

Figure 1:
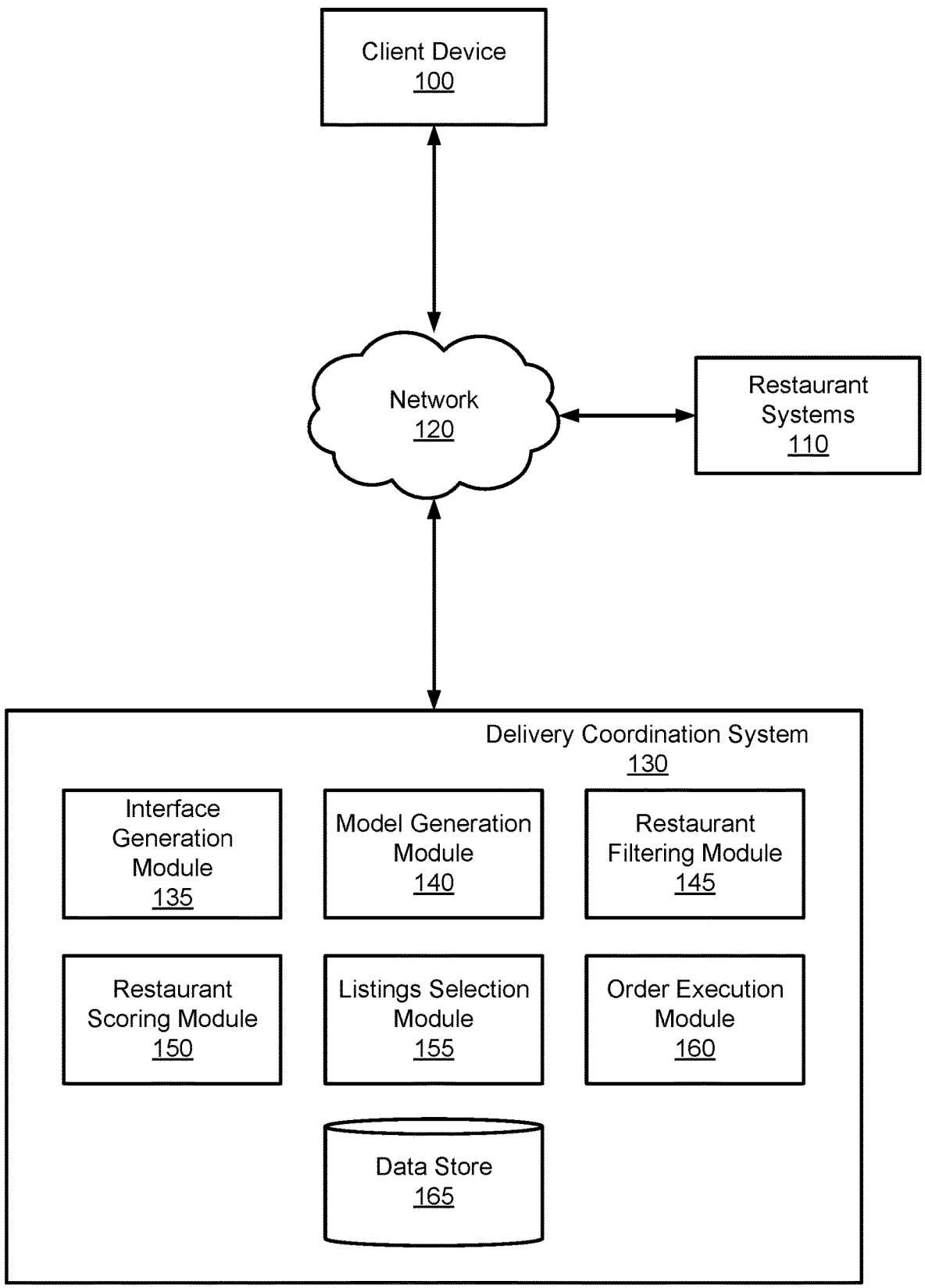
FIG. 1 illustrates an example system environment and architecture for a delivery coordination system, in accordance with some embodiments.

FIG. 1 illustrates an example system environment for a delivery coordination system 130, in accordance with some embodiments. The system environment illustrated in FIG. 1 includes a client device 100, restaurant systems 110, a network 120, and the delivery coordination system 130. Alternate embodiments may include more, fewer, or different components from those illustrated in FIG. 1, and the functionality of each component may be divided between the components differently from the description below. Additionally, each component may perform their respective functionalities in response to a request from a human, or automatically without human intervention.

A user interacts with the delivery coordination system 130 through a client device 100. The client device 100 can be a personal or mobile computing device, such as a smartphone, a tablet, a laptop computer, or desktop computer. In some embodiments, the client device 100 executes a client application that uses an application programming interface (API) to communicate with the delivery coordination system 130 through the network 120. The client device 100 submits a listings request to the delivery coordination system 130 to receive restaurant listings for restaurants to which the user can place an order. The listings request may include an identifier associated with the user, a timestamp of when the listings request was sent, the type of the client device 100, the location of the user or the client device 100, or a geographic area within which the delivery coordination system 130 should limit restaurant locations. In some embodiments, a listing request includes user-specified preferences, such as a preferred type of restaurant, a price range for restaurants, or a preferred delivery time. The client device 100 can transmit a listings request to the delivery coordination system 130 in response to the user selecting an option to receive restaurant listings or in response to the user opening a client application associated with the delivery coordination system 130 that operates on the client device 100. The client device 100 receives the restaurant listings from the delivery coordination system 130 and presents the results to the user through a user interface. The client device 100 may also provide a user interface to the user with additional information about the restaurant, such as the restaurant's location, pictures of the restaurant, delivery time estimates, or reviews from other users who have visited or ordered from the restaurant.

The client device 100 presents an option for a user to place an order with a restaurant included in the presented restaurant listings, and if the user selects the option to place an order, the client device 100 transmits the order request to the delivery coordination system 130 to coordinate delivery of the user's order. The order request may include food items selected by the user, an identifier for the restaurant from which the user is ordering, a time-frame within which the user would like the order to be delivered, and the user's payment information.

The restaurant systems 110 are one or more systems operated by restaurants to provide restaurant information to the delivery coordination system 130. Restaurant information may include the restaurant's hours, the restaurant's menu and prices, the type of cuisine the restaurant serves, the restaurant's contact information, the restaurant's location, or meal preparation time for the restaurant. The restaurant systems 110 may receive order notifications from the delivery coordination system 130 for users who are requesting delivery from the restaurants. An order notification may describe which items to prepare for an order, any special instructions or requests from the user on food preparation, when the order should be ready for pickup, and payment information to the restaurant for the order. When an order is ready for pickup at a restaurant, the restaurant system 110 for the restaurant may notify the delivery coordination system that the order is ready.

The restaurant systems 110 also facilitate payments to the delivery coordination system 130 for delivery coordination service. The delivery coordination system 130 may require a restaurant to pay a regular (e.g., monthly) fee to receive delivery coordination services, or may charge a fee for each order the delivery coordination system 130 coordinates for the restaurant.

The client device 100 and the restaurant systems 110 can communicate with the delivery coordination system 130 via the network 120, which may comprise any combination of local area and wide area networks employing wired or wireless communication links. In some embodiments, the network 120 uses standard communications technologies and protocols. For example, the network 120 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 120 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 120 may be represented using any format, such as hypertext markup language (HTML) or extensible markup language (XML). In some embodiments, all or some of the communication links of the network 120 may be encrypted.

FIG. 1 illustrates an example system architecture of a delivery coordination system 130, in accordance with some embodiments. The delivery coordination system 130 illustrated in FIG. 1 includes an interface generation module 135, a model generation module 140, a restaurant filtering module 145, a restaurant scoring module 150, a listings determination module 155, an order execution module 160, and a data store 165. Alternate embodiments may include more, fewer, or different components from those illustrated in FIG. 1, and the functionality of each component may be divided between the components differently from the description below. Additionally, each component may perform its respective functionalities in response to a request from a human, or automatically without human intervention.

The interface generation module 135 provides a frontend interface to the client device 100 to communicate with the delivery coordination system 130 through the network 120. The interface generation module 135 may provide application programming interface (API) functionality to send data directly to native client device operating systems. Additionally, the interface generation module 135 can serve web pages, as well as other web-related content. The interface generation module 135 receives listings requests from the client device 100 and transmits restaurant listings to the client device 100 for display to the user. The interface generation module 135 receives the restaurant listings to transmit to the client device 100 from the listings selection module 155. The interface generation module 135 also receives order requests from the client device 100 and transmits them to the order execution module 160 for execution.

The model generation module 140 generates delivery coordination models for the delivery coordination system 130. The delivery coordination system 130 uses delivery coordination models to determine which restaurant listings should be transmitted to a client device 100. The model generation module 140 collects delivery coordination data to generate delivery coordination models. Delivery coordination data is data associated with users, restaurants, orders, or deliveries that is stored by the delivery coordination system 130. For example, delivery coordination data can include a rate at which a restaurant receives orders, a rate at which a user places orders with the delivery coordination system 130, a user's location, which restaurants a user places orders with, costs of orders that users place using the delivery coordination system, and the types of cuisine served at restaurants. In some embodiments, the delivery coordination data also includes whether the user has been presented with a restaurant listing for a restaurant before, and whether the user has viewed additional information for the restaurant listing. The model generation module 140 can collect delivery coordination data from the client device 100, the restaurant systems 110, listings requests, order requests, or order notifications. In some embodiments, the model generation module 140 extracts features from the delivery coordination data to be used to generate the delivery coordination models. The extracted features may be directly extracted from the delivery coordination data, or may require the model generation module 140 to perform computations based on the delivery coordination data. The model generation module 140 may generate delivery coordination models using predetermined algorithms specified by developers of the delivery coordination system 130, or using machine-learning algorithms. For example, the model generation module 140 may generate delivery coordination models using statistical distributions, a neural network, a gradient boosted machine, a factorization machine, a generalized linear model, or a decision tree.

In some embodiments, the model generation module 140 generates a restaurant popularity model for each restaurant that uses the delivery coordination system 130. A restaurant popularity model represents a restaurant's popularity with users of the delivery coordination system 130, and can be generated based on order requests received by users of the delivery coordination system 130. For example, a restaurant popularity model may represent an average rate at which users submit order requests for the restaurant. The restaurant popularity model may be used to generate a popularity score for a restaurant that represents the restaurant's popularity.

The model generation module 140 can also generate a user preference model for each user of the delivery coordination system 130. A user preference model describes a user's preference for a type of restaurant, food item, restaurant price, or restaurant location. For example, a user preference model may indicate that a user prefers to order burgers from American-style restaurants that are near the user. A user preference model may be generated based on order requests submitted by the user associated with the user preference model. For example, the model generation module 140 may generate a user preference model based on which restaurants the user orders food from, which food items the user typically orders, the locations of restaurants from which the user has ordered, or the total costs of orders placed by a user.

In some embodiments, the model generation module 140 generates affinity models that describes the affinity of a user for a particular restaurant using the delivery coordination system 130. The model generation module 140 may generate an affinity model for a user-restaurant pair based on whether a user has submitted an order request to a restaurant in the past, whether the user has placed orders with similar restaurants, whether users that are similar to the user have placed an order to the restaurant, whether an order to the restaurant would be similarly priced to a typical order by the user, or whether the user is located near the restaurant. In some embodiments, the model generation module 140 generates the affinity models based on the restaurant popularity models and the user preference models. An affinity model may be configured to generate an affinity score for a user-restaurant pair that describes the user's affinity for the restaurant.

The restaurant filtering module 145 generates a filtered set of restaurant listings for a listings request. The filtered set of restaurant listings is a subset of the restaurant listings stored by the delivery coordination system 130 that are further considered for presentation to the user in response to a listings request. By generating the filtered subset of restaurant listings, the restaurant filtering module 145 reduces the number of restaurants being scored by the restaurant scoring module 150 and the listings selection module 155, thereby reducing the computational resources used by the delivery coordination system 130. The filtered set of restaurant listings may be generated upon receiving the listings request, or may be pre-generated before the listings request is received.

To generate the filtered set of restaurant listings, the restaurant filtering module 145 applies filtering criteria to the restaurant listings stored by the delivery coordination system 130. The filtering criteria specify which restaurants should be included in the filtered set of restaurant listings. In some embodiments, the filtering criteria may include a geographic region within which a restaurant must be located to be included in the filtered set of restaurant listings. The geographic region may be determined based on the user's location, or may be specified by the user in the listings request.

The filtering criteria include popularity criteria for restaurants to be included in the filtered set of restaurant listings. The popularity criteria can specify a threshold popularity for a restaurant to be included in the filtered set of restaurant listings. For example, the popularity criteria may require that a restaurant be associated with at least a threshold popularity score to be included in the filtered set. The popularity criteria may also be based on a ranking of popularity scores for the restaurants using the delivery coordination system 130. For example, the restaurant filtering module 145 may select a restaurant for the filtered set of restaurant listings if the restaurant ranks above a threshold ranking. In some embodiments, the popularity criteria are based on popularity scores generated by restaurant popularity models for the restaurants using the delivery coordination system 130. For example, the restaurant filtering module 145 may use the restaurant popularity models to generate popularity scores for each restaurant using the delivery coordination system 130 and then selects restaurants for the filtered set based on the generated popularity scores. In some embodiments, the restaurant filtering module 145 only applies the popularity criteria to restaurants that are within a geographic region surrounding the user's location or a geographic region specified by the user.

The popularity criteria may be dynamically adjusted by the restaurant filtering module 145. For example, the delivery coordination system 130 may adjust the popularity criteria based on the availability of computational resources to the delivery coordination system 130. If the delivery coordination system 130 is using a large or increasing amount of the computational resources available to it, then the restaurant filtering module 145 may raise the threshold popularity score or popularity ranking for restaurants to be included in the filtered set of restaurant listings. Similarly, if the delivery coordination system 130 is using a small or decreasing amount of the computational resources available to it, then the restaurant filtering module 145 may decrease the threshold popularity score or popularity ranking for restaurants to be included in the filtered set of restaurant listings. In some embodiments, the popularity criteria are dynamically adjusted based on the time of day. For example, the popularity criteria may increase the threshold popularity score or popularity ranking during busy meal hours, such as around lunch-time or dinner-time.

Additionally, the popularity criteria may be adjusted such that a restaurant with low popularity is included in the filtered set of restaurant listings if the restaurant's popularity is determined based on insufficient data. If a restaurant recently opened or started using the delivery coordination system 130, the model generation module 140 may not have collected very much delivery coordination data relating to the new restaurant. Thus, to ensure that a new restaurant that may be a good choice for a user is not filtered out by the restaurant filtering module 145 because the new restaurant has not had time for users to start ordering from the new restaurant, the restaurant filtering module 145 may adjust the popularity criteria to ensure that some low-popularity restaurants associated with low amounts of delivery coordination data are included in the filtered list of restaurant listings. In some embodiments, the popularity criteria include a threshold confidence in a restaurant's popularity. If a confidence score of a restaurant's popularity is below the threshold, the restaurant may be included in the filtered set of restaurant listings. The restaurant filtering module 145 may determine the confidence score of a restaurant's popularity based on the number of order requests the delivery coordination system 130 has received for the restaurant, the amount of time the restaurant has used the delivery coordination system 130, or the variance of the historical conversion rate of a restaurant when the restaurant's listing is presented to the user. In some embodiments, the restaurant filtering module 145 uses an upper confidence bound algorithm to determine the confidence score for a restaurant.

The restaurants scoring module 150 generates conversion scores for the restaurants included in the filtered set of restaurant listings associated with a listings request from a user. A conversion score describes a likelihood that the user will submit an order request for the restaurant associated with the conversion score. The restaurant scoring module 150 can generate the conversion scores based on delivery coordination data, such as order requests submitted by the user, the user's location, restaurants to for which the user has submitted orders, the time when the user submitted the listings request, the requested delivery time for the order, the type of the restaurants, the locations of the restaurants, and the cost of a typical order from the restaurant. In some embodiments, the restaurants scoring module 150 uses the restaurant popularity models, user preference models, or the affinity models generated by the model generation module 140 to generate the conversion scores for the restaurants in the filtered set of restaurant listings.

The listings selection module 155 selects which restaurant listings from the filtered set of restaurants listings are transmitted to the client device 100 in response to a listings request. In some embodiments, the listings selection module 155 selects the restaurant listings based on the conversion scores generated by the restaurant scoring module 150. For example, the listings selection module 155 may select the restaurants with conversion scores that are above a threshold score, or may rank the restaurants based on the conversion scores and select restaurants that rank above a threshold rank. The listings selection module 155 transmits the selected restaurants to the interface generation module 135 to be transmitted to the client device 100 for display to the user.

In some embodiments, the listings selection module 155 selects the restaurants based on a plurality of selection factors associated with the restaurants, where the plurality of selection factors can include the conversion scores of the restaurants. Example selection factors include the time since a restaurant's last order request, whether the restaurant is a new restaurant, the restaurant's real-time and historical number of order requests, and the size of the fees the restaurant pays to use the delivery coordination system 130. The listings selection module 155 may apply weights to the selection factors to determine whether to select the restaurant for presentation to the user. The listings selection module 155 can determine the weights for the selection factors using a machine-learning algorithm, or the weights may be specified by a developer of the delivery coordination system 130. In some embodiments, the listings selection module 155 generates a selection score for each restaurant listing based on the selection factors, and the selection scores may be used to select restaurants to be presented to the user. In some embodiments, listings selection module 155 selects restaurants whose selection scores exceed a threshold. The listing selection module also may rank the restaurants based on the selection scores, and may select restaurants whose rankings exceed a threshold ranking.

In some embodiments, the selection factors include whether the restaurant could be included in a customized group. A customized group is a grouping for restaurants that is customized for a particular user, and is presented to the user via the client device 100. For example, if a user frequently submits order requests for restaurants that serve a particular cuisine, the listings selection module 155 may generate a customized group of restaurants serving that particular cuisine for the user, and may select restaurants from the filtered set of restaurant listings that can be included in that customized group. The listings selection module 155 may generate customized groups that are based on restaurant types, restaurant locations, restaurant cost, when the restaurants joined the delivery coordination system 130, or the conversion scores of the restaurants. Restaurants may be included in more than one customized group. For example, a restaurant may be included in a customized group for a particular cuisine type as well as a customized group for restaurant locations. In some embodiments, the listings selection module 155 only generates a customized group if a sufficient number of restaurants that could be included in the group have already been selected by the listings selection module 155 to be presented to the user.

In some embodiments, to determine how to weight the selection factors, the listings selection module 155 optimizes for the success of all restaurants using delivery coordination system 130. For example, the listings selection module 155 may weigh the selection factors to optimize the total number of order requests received by the delivery coordination system 130, the total amount of money received by all restaurants using the delivery coordination system 130, the retention rate of restaurants using the delivery coordination system 130, the total amount of fees paid by restaurants using the delivery coordination system 130, or the total number of restaurants using the delivery coordination system 130. Thus, rather than optimizing for the highest likelihood of the user transmitting an order request, which may result in the listings selection module 155 selecting the same restaurants repeatedly for presentation to the same users, the listings selection module 155 selects restaurants for presentation that optimize for the success of all restaurants using the delivery coordination system 130, thereby encouraging newer and potentially more popular restaurants to use the delivery coordination system 130.

The order execution module 160 executes an order request from a client device 100. The order execution module 160 receives an order request from a client device 100 and transmits an order notification to the restaurant system 110 of the restaurant identified in the order request. The order execution module 160 also identifies a driver that is available to deliver the user's order, and transmits instructions to the driver to pick up the user's order and deliver it to the user. In some embodiments, the order execution module 160 transmits updates to the user of the progress of the user's order (e.g., whether the food is prepared or whether the food is en route to the user's location). The order execution module 160 also requests payment from the user for the order and delivers payment for the order to the restaurant system 110 associated with the restaurant with which the user placed an order. Additionally, the order execution module 160 collects payment for fees to the delivery coordination system from the user or the restaurant for using the delivery coordination system 130.

The data store 165 stores delivery coordination data for the delivery coordination system 130. For example, the data store 165 can store order requests, order notifications, payment information, listings requests, user information, and restaurant information. Additionally, the data store 165 can store delivery coordination models generated by the model generation module 140, such as the restaurant popularity models, the user preference models, or the affinity models, as well as popularity scores, affinity scores, or conversion scores generated based on these models. The data store 165 also may store data about drivers who are associated with the delivery coordination system 130, such as the driver's location and availability for delivery. The data store 165 may categorize delivery coordination data based on user, restaurant, or geographic area.

Figure 2:
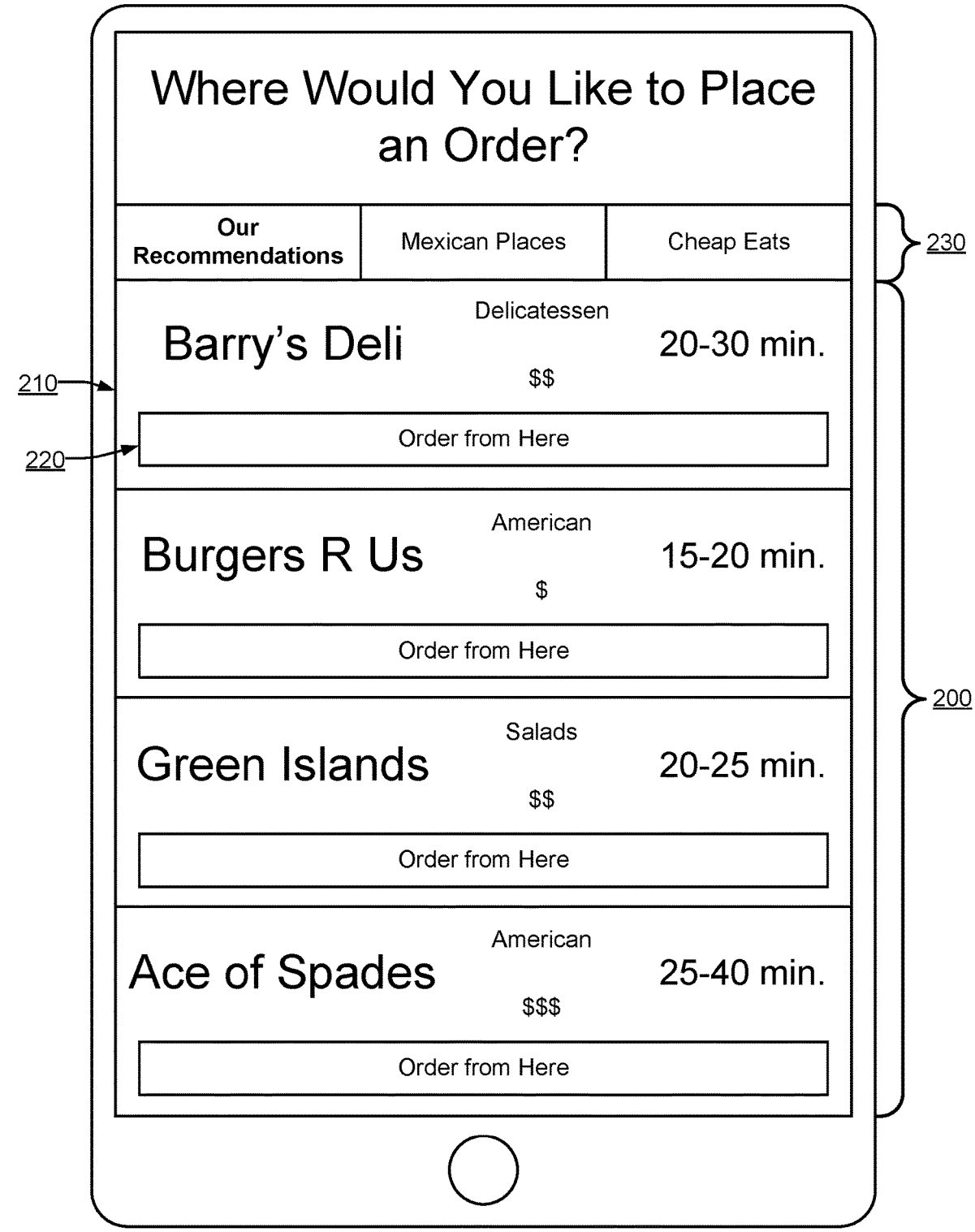
FIG. 2 illustrates an example user interface presenting restaurant listings selected by a delivery coordination system, in accordance with some embodiments.

FIG. 2 illustrates an example user interface presenting restaurant listings 200 selected by a delivery coordination system 130, in accordance with some embodiments. The restaurant listings 200 are presented with restaurant information 210 for each restaurant, such as the name of the restaurant, the type of the restaurant, the price of the restaurant, and an approximate amount of time for the user to receive a delivery from the restaurant. Additionally, each restaurant listing 200 includes an option 220 to place an order request with the restaurant though the delivery coordination system 130. If the user selects the option 220 to place an order, the user may be presented with a user interface to select items to order from the restaurant. The user interface illustrated FIG. 2 also illustrates options 230 for a user to select customized groups of restaurant listings. If the user selects one of the customized group options 230, the user is presented with restaurant listings associated with the customized group.

Figure 3:
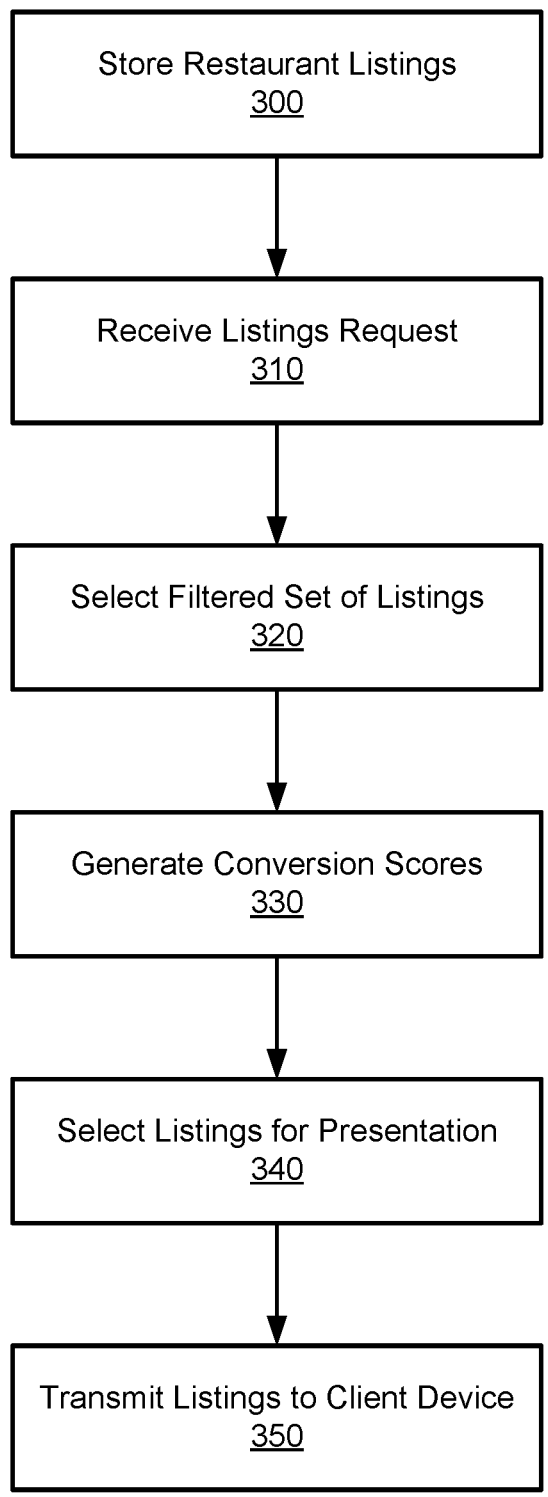
FIG. 3 is a flowchart for a method of selecting restaurant listings for presentation to a user, in accordance with some embodiments.

FIG. 3 is a flowchart for a method of selecting restaurant listings for presentation to a user, in accordance with some embodiments. Alternate embodiments may include more, fewer, or different steps from those illustrated in FIG. 3, and the steps may be performed in a different order from that illustrated in FIG. 3. Additionally, each of these steps may be performed automatically by the delivery coordination system without human intervention.

The delivery coordination system 130 stores a plurality of restaurant listings 300 and receives a listings request 310 from a client device. The delivery coordination system 130 selects a filtered set of the restaurant listings 320 from the plurality of listings. The delivery coordination system may apply filtering criteria to the plurality of restaurant listings to select the filtered set. The filtering criteria may include popularity criteria, and may be adjusted based on the amount of data stored by the delivery coordination system 130 for each restaurant.

The delivery coordination system 130 generates conversion scores 330 for the filtered set of restaurant listings that represent the likelihood that the user will order from the restaurants. In some embodiments, the conversion scores are generated based on affinity models, restaurant popularity models, or user preference models. The delivery coordination system 130 selects restaurant listings to be presented 340 to the user based on the conversion scores. In some embodiments, the restaurant listings are selected based on selection factors, which can include the generated conversion scores. The selection factors may additionally include whether the restaurants can be grouped into a customized group. The selection factors may be weighted based on models that optimize for the success of all restaurants in the delivery coordination system 130. The delivery coordination system 130 transmits the selected restaurant listings 350 to the client device 100 for presentation to a user.

Figure 4:
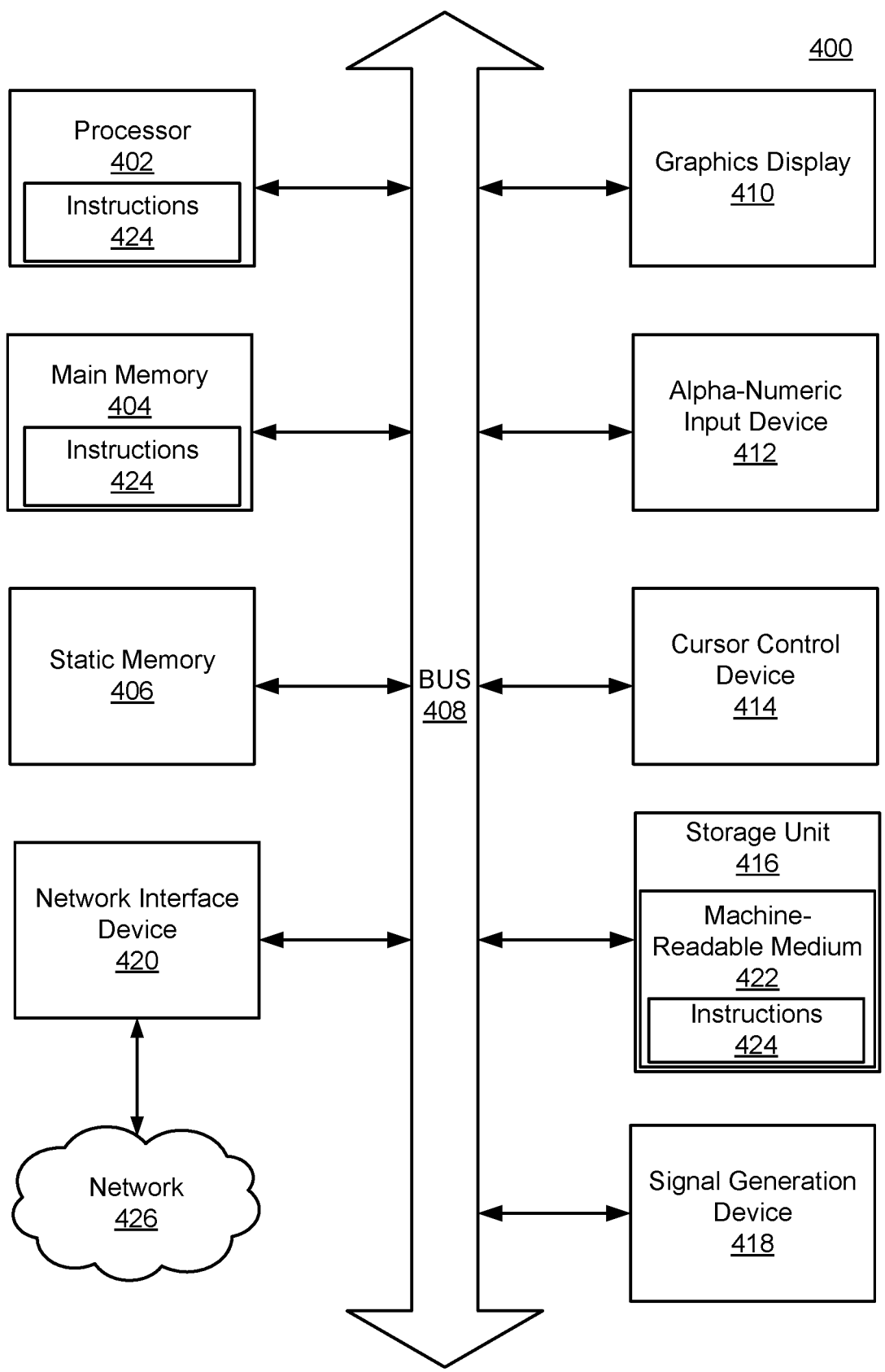
FIG. 4 is a block diagram illustrating components of an example machine able to read instructions from a machine-readable medium and execute them in a processor (or controller).

FIG. 4 is a block diagram illustrating components of an example machine able to read instructions from a machine-readable medium and execute them in a processor (or controller). Specifically, FIG. 4 shows a diagrammatic representation of a machine in the example form of a computer system 400. The computer system 400 can be used to execute instructions 424 (e.g., program code or software) for causing the machine to perform any one or more of the methodologies (or processes) described herein. In alternative embodiments, the machine operates as a standalone device or a connected (e.g., networked) device that connects to other machines. In a networked deployment, the machine may operate in the capacity of a server machine or a client machine in a server-client network environment, or as a peer machine in a peer-to-peer (or distributed) network environment.

The machine may be a server computer, a client computer, a personal computer (PC), a tablet PC, a set-top box (STB), a smartphone, an internet of things (IoT) appliance, a network router, switch or bridge, or any machine capable of executing instructions 424 (sequential or otherwise) that specify actions to be taken by that machine. Further, while only a single machine is illustrated, the term "machine" shall also be taken to include any collection of machines that individually or jointly execute instructions 424 to perform any one or more of the methodologies discussed herein.

The example computer system 400 includes one or more processing units (generally processor 402). The processor 402 is, for example, a central processing unit (CPU), a graphics processing unit (GPU), a digital signal processor (DSP), a controller, a state machine, one or more application specific integrated circuits (ASICs), one or more radio-frequency integrated circuits (RFICs), or any combination of these. The computer system 400 also includes a main memory 404. The computer system may include a storage unit 416. The processor 402, memory 404, and the storage unit 416 communicate via a bus 408.

In addition, the computer system 400 can include a static memory 406, a display driver 410 (e.g., to drive a plasma display panel (PDP), a liquid crystal display (LCD), or a projector). The computer system 400 may also include alphanumeric input device 412 (e.g., a keyboard), a cursor control device 414 (e.g., a mouse, a trackball, a joystick, a motion sensor, or other pointing instrument), a signal generation device 418 (e.g., a speaker), and a network interface device 420, which also are configured to communicate via the bus 408.

The storage unit 416 includes a machine-readable medium 422 on which is stored instructions 424 (e.g., software) embodying any one or more of the methodologies or functions described herein. The instructions 424 may also reside, completely or at least partially, within the main memory 404 or within the processor 402 (e.g., within a processor's cache memory) during execution thereof by the computer system 400, the main memory 404 and the processor 402 also constituting machine-readable media. The instructions 424 may be transmitted or received over a network 426 via the network interface device 420.

While machine-readable medium 422 is shown in an example embodiment to be a single medium, the term "machine-readable medium" should be taken to include a single medium or multiple media (e.g., a centralized or distributed database, or associated caches and servers) able to store the instructions 424. The term "machine-readable medium" shall also be taken to include any medium that is capable of storing instructions 424 for execution by the machine and that cause the machine to perform any one or more of the methodologies disclosed herein. The term "machine-readable medium" includes, but not be limited to, data repositories in the form of solid-state memories, optical media, and magnetic media.

Additional Configurations

While the methods and systems disclosed herein may be described in the context of the presentation of listings for restaurants, the methods and systems described herein may be applied more generally to networked systems that present listings for establishments to users. For example, in some embodiments, a networked system stores a plurality of listings associated with a plurality of establishments. The networked system receives a listings request from a client device, the listings request identifying a user of the networked system who is associated with the client device. The networked system selects a filtered set of the plurality of listings by applying filtering criteria to the plurality of listings, wherein the filtering criteria comprise popularity criteria. The networked system generates a conversion score for each listing of the filtered set of listings, each conversion score representing a likelihood that the user will order from the establishment associated with the listing using the networked system. The networked system selects one or more listings of the filtered set of listings for presentation to the user based on the generated conversion scores, and transmits the selected one or more listings to the client device.

Additional Considerations

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In some embodiments, a software module is implemented with a computer program product comprising a computer-readable medium containing computer program code, which can be executed by a computer processor for performing any or all of the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a nontransitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A method for selecting listings for a listings request from a client device comprising:

storing, by a networked system, a plurality of listings associated with a plurality of establishments from which an order may be placed;

receiving a listings request from a client device, the listings request identifying a user of a networked system who is associated with the client device;

determining, by the networked system, filtering criteria, wherein the filtering criteria comprise a threshold popularity applied to the establishments in the plurality of listings and are adjusted based at least in part on computational resources used by the networked system, such that a reduced number of listings of the plurality of listings is selected responsive to the networked system using more than a threshold amount of computational resources;

selecting a filtered set of listings of the plurality of listings by applying the determined filtering criteria to the plurality of listings;

generating a conversion score for each listing of the filtered set of listings, each conversion score representing a likelihood that the user will order from the establishment associated with the listing using the networked system;

selecting one or more listings of the filtered set of listings for presentation to the user based on selection factors associated with the one or more listings, the selection factors including the generated conversion scores; and transmitting the selected one or more listings to the client device.

2. The method of claim 1, wherein the plurality of establishments are restaurants.

3. The method of claim 2, further comprising:
receiving an order request from the client device, the order request describing an order for a restaurant associated with one of the selected one or more listings; and
transmitting an order notification to a restaurant system associated the restaurant.

4. The method of claim 1, wherein the listings request includes one or more user-specified preferences.

5. The method of claim 1, wherein applying the determined filtering criteria to the plurality of listings comprises:
generating a popularity score for each of the plurality of listings; and
selecting a listing to be included in the filtered set of listings based on whether the popularity score for the listing exceeds the threshold popularity.

6. The method of claim 5, wherein the popularity scores are generated based on popularity models for the plurality of establishments.

7. The method of claim 1, wherein applying the determined filtering criteria to the plurality of listings comprises: adjusting the filtering criteria based on an amount of data stored by the networked system about each establishment of the plurality of establishments.

8. The method of claim 1, wherein the conversion scores are generated based on at least one of establishment popularity models, user preference models, or affinity models.

9. The method of claim 1, wherein selecting the one or more listings for presentation to the user comprises: applying weightings to the selections factors associated with the one or more listings.

10. The method of claim 9, wherein the weightings are determined based on models that optimize for the success of all of the plurality of establishments stored by the networked system.

11. A non-transitory, computer-readable medium comprising instructions for a method for selecting listings for a listings request from a client device that, when executed by a processor, cause the processor to:
store, by a networked system, a plurality of listings associated with a plurality of establishments from which an order may be placed;
receive a listings request from a client device, the listings request identifying a user of a networked system who is associated with the client device;
determine, by the networked system, filtering criteria, wherein the filtering criteria comprise a threshold popularity applied to the establishments in the plurality of listings and are adjusted based at least in part on computational resources used by the networked system, such that a reduced number of listings of the plurality of listings is selected responsive to the networked system using more than a threshold amount of computational resources;
select a filtered set of listings of the plurality of listings by applying the determined filtering criteria to the plurality of listings;
generate a conversion score for each listing of the filtered set of listings, each conversion score representing a likelihood that the user will order from the establishment associated with the listing using the networked system;
select one or more listings of the filtered set of listings for presentation to the user based on selection factors associated with the one or more listings, the selection factors including the generated conversion scores; and
transmit the selected one or more listings to the client device.

12. The computer-readable medium of claim 11, wherein the listings request includes one or more user-specified preferences.

13. The computer-readable medium of claim 11, wherein the instructions for applying the determined filtering criteria to the plurality of listings comprise instructions that cause the processor to:
generate a popularity score for each of the plurality of listings; and
select a listing to be included in the filtered set of listings based on whether the popularity score for the listing exceeds the threshold popularity.

14. The computer-readable medium of claim 13, wherein the popularity scores are generated based on popularity models for the plurality of establishments.

15. The computer-readable medium of claim 11, wherein the instructions for applying the determined filtering criteria to the plurality of listings comprise instructions that cause the processor to: adjust the filtering criteria based on an amount of data stored by the networked system about each establishment of the plurality of establishments.

16. The computer-readable medium of claim 11, wherein the conversion scores are generated based on at least one of establishment popularity models, user preference models, or affinity models.

17. The computer-readable medium of claim 11, wherein the instructions for selecting the one or more listings for presentation to the user comprise instructions that cause the processor to: apply weightings to the selections factors associated with the one or more listings.

18. The computer-readable medium of claim 17, wherein the weightings are determined based on models that optimize for the success of all of the plurality of establishments stored by the networked system.

* * * * *